United States Patent [19]
Thomassin et al.

[11] Patent Number: 6,047,924
[45] Date of Patent: Apr. 11, 2000

[54] METHOD OF FOLDING THE BLADES OF A MAIN ROTOR OF A ROTARY-WING AIRCRAFT, AND APPARATUS FOR IMPLEMENTING THE METHOD

[75] Inventors: René Thomassin, Velaux; Jean Jacques Polveda, Aubagne; Albert Henri Bernard Gemmati, Marseille, all of France

[73] Assignee: Eurocopter, Marignane Cedex, France

[21] Appl. No.: 08/953,985

[22] Filed: Oct. 20, 1997

[30] Foreign Application Priority Data

Oct. 22, 1996 [FR] France .................................. 96 12817

[51] Int. Cl.$^7$ ........................................................ B64C 3/56
[52] U.S. Cl. ........................ 244/49; 244/39; 244/17.11; 244/6; 416/142
[58] Field of Search ............................ 244/49, 39, 17.11, 244/6; 416/142

[56] References Cited

U.S. PATENT DOCUMENTS

| 3,153,455 | 10/1964 | Mosinskis | 244/49 |
|---|---|---|---|
| 3,369,611 | 2/1968 | Vacca et al. | 244/17.11 |
| 3,744,742 | 7/1973 | Gear | 244/17.11 |
| 3,874,817 | 4/1975 | Ferris | 416/143 |
| 4,738,592 | 4/1988 | Cavanaugh | 416/140 |
| 5,149,013 | 9/1992 | Costanzo | 244/17.11 |
| 5,322,415 | 6/1994 | White et al. | 416/143 |
| 5,782,606 | 7/1998 | Mondet et al. | 416/142 |

FOREIGN PATENT DOCUMENTS 2 085 194  4/1982  United Kingdom .

OTHER PUBLICATIONS

EH101 Helicopter Folding System, Sep. 14–16, 1993, Nineteenth European Rotorcraft Forum.

*Primary Examiner*—J. Woodrow Eldred
*Attorney, Agent, or Firm*—Henderson & Sturm

[57] ABSTRACT

Once the rotor of a rotary-wing aircraft is held stationary in an indicated position, the method comprises steps consisting in placing the collective pitch control stick in a first predefined position corresponding to a first inclination of the blades about their longitudinal axes, in placing the cyclic pitch control stick in a second predefined position corresponding to a nose-up position of the rotary-wing aircraft, in modifying the length of the control system to cause the inclination of the blades about their longitudinal axes to go to a second value that is different from said first inclination value, in holding a rotary swashplate stationary by placing at least three locking connection rods between the rotary swashplate and a member integral in terms of rotation with a rotor mast, and in folding the blades by rotating each of them about a corresponding coupling pin for coupling it to a coupling member for coupling the blade to a rotor hub.

17 Claims, 8 Drawing Sheets

6,047,924

METHOD OF FOLDING THE BLADES OF A MAIN ROTOR OF A ROTARY-WING AIRCRAFT, AND APPARATUS FOR IMPLEMENTING THE METHOD

FIELD OF THE INVENTION

The invention relates to a method of folding the blades of a main rotor of a rotary-wing aircraft so that they are disposed substantially parallel to a longitudinal axis of the rotary-wing aircraft, each blade of the rotor being firstly rotated about an axis of rotation of a rotor via a hub which is constrained to rotate with a rotor mast, and to which said blade is coupled by a coupling member to which the blade is fixed by at least one coupling pin, and secondly constrained to rotate about a longitudinal pitch axis of the blade with a pitch lever controlled by a pitch rod connected to a rotary swashplate that rotates with the rotor mast and that belongs to a cyclic-swashplate mechanism in which the rotary swashplate is mounted to rotate on a non-rotary swashplate that can slide axially along the rotor mast and that can be inclined in any direction relative thereto under the action of a control system including control actuators themselves actuated by two control sticks, namely a collective pitch control stick and a cyclic pitch control stick, placed in a cockpit of the rotary-wing aircraft.

The invention also relates to apparatus for implementing the method of folding.

BACKGROUND OF THE INVENTION

In order to reduce the amount of space taken up by the main rotor of a helicopter as parked on a parking area, on the deck of a ship if the helicopter is an on-board helicopter, or else stowed in a hangar, it is known to equip helicopters with rotors in which each blade is foldable.

Generally, the blade is folded about a folding axis situated at the radially outer end (relative to the axis of the rotor) of a coupling member, called coupling sleeve serving to couple the root of the blade to the hub, and itself being connected to the hub by retaining and hinging means whereby the blade can make pitch, flap, and drag angular movements.

Such movements, and in particular pitch angular movements, must be prevented while the blades are being folded.

If a blade is not prevented from pitching while it is being folded, the flapping mass constituted by the blade and its associated sleeve tilts about its pitch-changing axis. Such tilting can be dangerous for the operators working around the helicopter, and for the corresponding retaining and hinging means for the blade, which means might be damaged.

In addition, gusts of wind or movements of the ship on board which the helicopter is situated can cause the flapping masses to be displaced, which might damage the constituent parts of the rotor, or be dangerous for the operators.

To mitigate those drawbacks, methods of folding blades have already been proposed in which the blades are prevented from pitching firstly by disuniting the pitch rods from the pitch levers. Then each blade sleeve is angularly positioned to the required folding inclination, and the sleeve is secured to a member of the hub that is prevented from pitching. The pitch rods are then retained with blade pin clips placed firstly across the necks of devises or in bores in the pitch rods, and secondly in bores with ball joints on the pitch levers.

That folding method is quite satisfactory as regards preventing the blades from pitching, but, when the blades are deployed, it makes it necessary to put back into place the fixing means for fixing each pitch lever to the corresponding pitch rod, so as to ensure that the pitch of each blade is set.

OBJECTS AND SUMMARY OF THE INVENTION

An object of the invention is to remedy the above-mentioned drawbacks by using means that are simple, effective, and cheap.

To this end, according to the invention, a method of folding blades that is of the type in question is essentially characterized in that, once the rotor is held stationary in an indicated position, the method consists in:

placing the collective pitch control stick in a first predefined position corresponding to a first inclination of the blades about their longitudinal axes;

placing the cyclic pitch control stick in a second predefined position;

modifying the length of the control system to cause the inclination of the blades about their longitudinal axes to go to a second value;

holding the rotary swashplate stationary by placing at least three locking connection rods between the rotary swashplate and a member integral in terms of rotation with the rotor mast; and folding the blades by rotating each of them about a corresponding coupling pin for coupling it to its sleeve.

The present invention thus makes it possible to retain all of the constituent parts of the rotor in their operating state, and it therefore requires no adjustment after the blades have been deployed.

The method of the invention may optionally include one or more of the following characteristics:

with the control system including at least one control connection rod interposed between said control sticks and the control actuators acting on actuating connection rods for actuating the non-rotary swashplate, the length of said at least one control connection rod is modified so as to place the non-rotary swashplate in a position corresponding to said second value of the inclination of the blades;

the step consisting in modifying the length of the control connection rod comprises steps consisting in:

unlocking drive means for longitudinally displacing a first portion of the control connection rod relative to a second portion of said control connection rod by inserting a member through said portions so as to disengage means for preventing said drive means carried by said second portion from moving, and by removing a pin preventing the drive means from moving relative to said second portion; and actuating said drive means to cause the first portion to be displaced longitudinally relative to the second portion of said control connection rod;

the step in which said member is inserted through said portions consists in causing the member to pass radially through said portions so that said member projects in front of the back of the pilot's seat;

the step consisting in holding the rotary swashplate stationary by placing at least three locking connection rods between the rotary swashplate and the member integral in terms of rotation with the rotor mast consists in placing the same number of locking connection rods as there are pitch rods;

a first end of each of the locking connection rods is fixed to a coupling for coupling the hub to a corresponding drag damper, and the opposite second end of each of said locking rods is fixed to a hinge pin for hinging the corresponding pitch rod to the rotary swashplate;

prior to locking the collective pitch control stick in the position corresponding to said first value of the inclination of the blades, flap wedges are placed between the hub and the inner ends of the blade sleeves;

with a rigid lower flap-stop ring being mounted to move radially relative to the rotor mast under the hub, and each of the sleeves of the blades carrying an upper flap stop, the flap wedges are placed between the hub and the upper flap stops;

with the roots of the blades carrying pendulum vibration dampers mounted to move between a high position and a low position, the vibration dampers are held stationary in the high position before the flap wedges are put in place; and the step consisting in folding the blades comprises steps consisting in:

hooking a pole onto the end portion of each blade to be folded;

lightening the load on the blade hooked onto the pole;

with the blade being coupled to the sleeve by first and second coupling pins situated respectively in the vicinity of the leading edge of the blade and in the vicinity of the trailing edge thereof, extracting that one of the two coupling pins which is situated closer to the front of the rotary-wing aircraft so as to pivot the blade towards the rear of the rotary-wing aircraft about the other coupling pin; and with the rotor being a four-blade rotor, causing the two blades extending towards the rear of the rotary-wing aircraft to be pivoted first, and then successively pivoting the two blades extending towards the front of the rotary-wing aircraft.

In addition, the invention also provides an apparatus for implementing the above-mentioned method, the apparatus being essentially characterized in that the control connection rod comprises a threaded first portion slidably received in a second portion having one of its ends carrying an unlockable drive nut for longitudinally displacing the first portion relative to the second portion by co-operating with said threaded first portion.

The apparatus of the invention may optionally include one or more of the following characteristics:

the second portion carries a catch for preventing the nut from moving on the second portion, the catch co-operating with a notch provided in the ring of the nut, and designed to be retracted by a member radially passing through the second portion;

the control connection rod is provided with a removable pin for preventing the nut from moving on the second portion and which passes through the ring of the nut as well as through a finger carried by the second portion;

the second portion is provided with a stop pin for stopping the first portion on the second portion;

a window is provided over a portion of the length of the first portion to enable said first portion to move relative to the stop pin;

the lengths of the locking connection rods are adjustable; and each of the locking connection rods is provided with a ball at each of its ends, first balls on said rods being designed to be retained by means of cotter pins in clevises carried by the couplings for coupling the drag dampers to the hub, and second balls on said rods being designed to be fixed by bolts to the hinge pins of the pitch rods.

BRIEF DESCRIPTION OF THE DRAWINGS

An implementation of the invention is described below with reference to the accompanying drawings, in which.

MORE DETAILED DESCRIPTION

Figure 1:
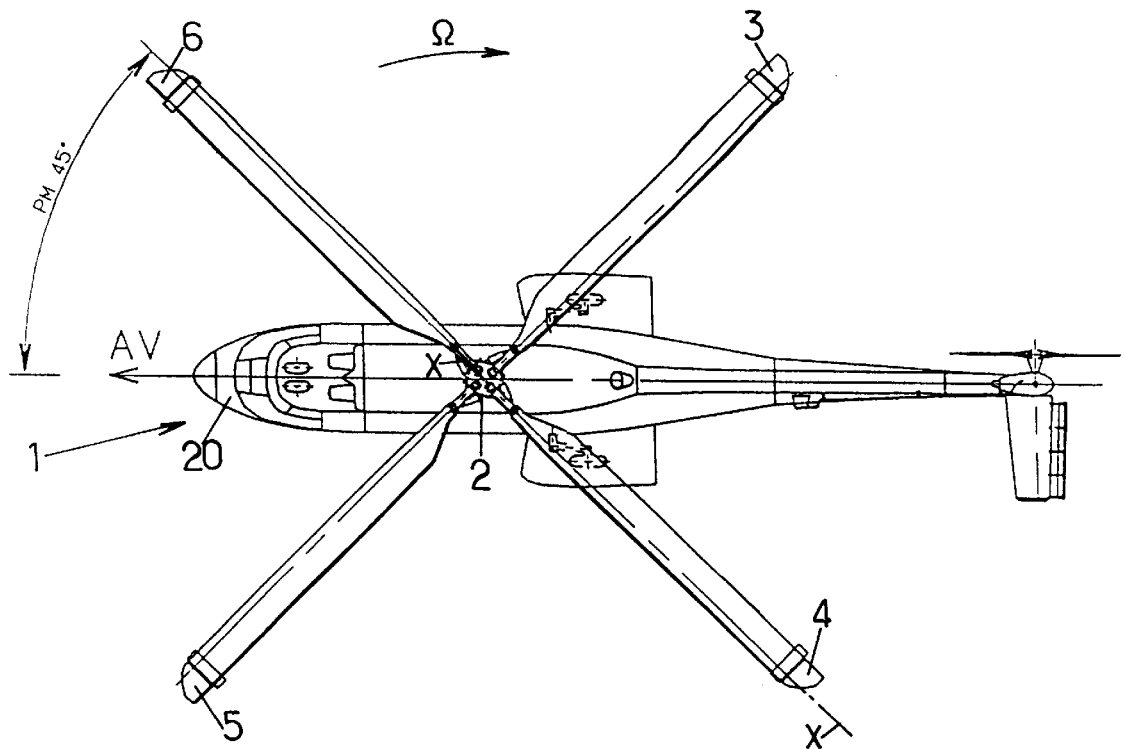
FIG. 1 is a plan view of a helicopter provided with a rotor having blades that can be folded by implementing the method of the present invention, the blades being shown in the deployed or "flying" position.

FIG. 1 shows a rotary-wing aircraft 1, such as a helicopter, equipped with a main rotor 2 which rotates four helicopter blades 3 to 6.

Figure 2:
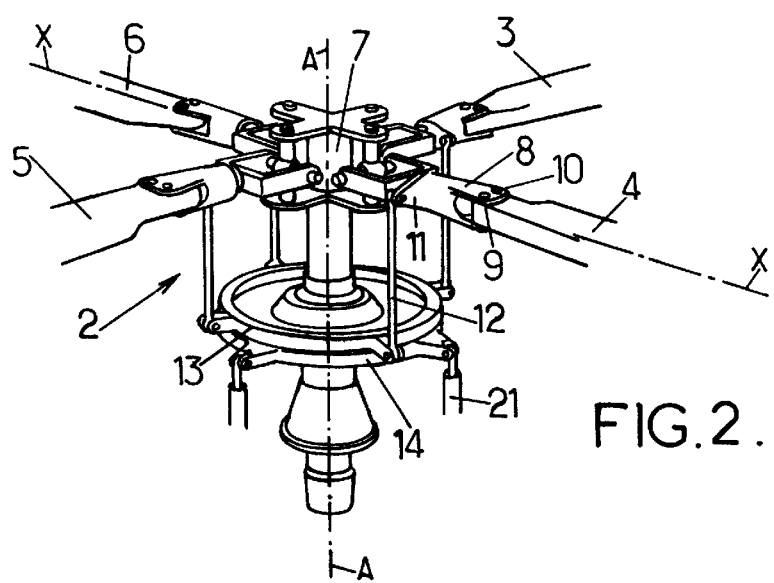
FIG. 2 is a perspective view of a conventional rotor head equipped with a conventional hub.

As shown in FIG. 2, the blades 3 to 6 are rotated about an axis of rotation A—A of the rotor mast 2, via a hub 7. Blade 4 is, in conventional manner, coupled to the hub 7 by a coupling sleeve 8 to which its blade root is fixed by two coupling pins 9 and 10 which are disposed symmetrically on either side of a longitudinal pitch axis X—X of the blade. The other blades are coupled in the same way to the hub 7.

Each sleeve 8 is itself connected to the hub 7 by retaining hinge means allowing pitch, flap, and drag angular movements of the corresponding blade and its sleeve 8 relative to the hub 7.

As shown diagrammatically in FIG. 2, each of the retaining hinge means may be a hinge that pivots about three axes that are perpendicular in pairs, or else each of said means may comprise at least one spherical laminated bearing of any known type. Such a bearing comprises a central portion, made up of an alternating stack of resiliently deformable layers and of spherical cap shaped rigid dishes, between a radially outer strength member fixed to the hub 7 and a radially inner strength member fixed to the radially inner end of the sleeve 8.

In addition, each blade is constrained to rotate about its longitudinal pitch axis X—X with a pitch lever 11. The pitch lever 11 is controlled by a pitch rod 12 itself connected to a rotary swashplate 13 that rotates with the rotor mast 2. The rotary swashplate 13 is a component of a cyclic-swashplate mechanism.

In this cyclic-swashplate mechanism, the rotary cyclic swashplate 13 is mounted to rotate on a non-rotary swashplate 14. The non-rotary swashplate 14 can slide axially along the rotor mast 2 parallel to the axis A—A, and it can be inclined in all directions relative to the rotor mast. The non-rotary swashplate may also be referred to as the "stationary cyclic swashplate".

Figure 3:
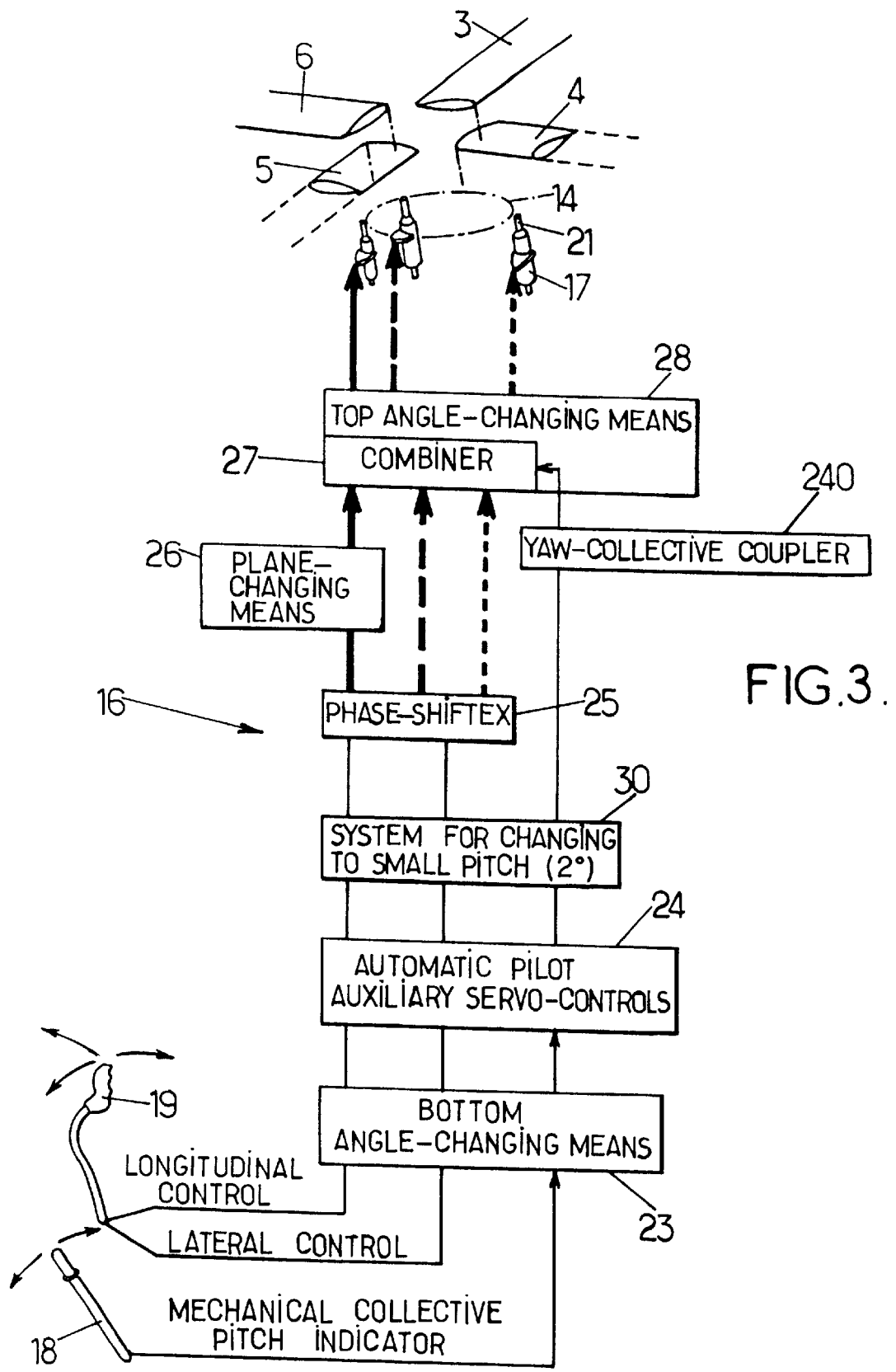
FIG. 3 shows the control system of the invention for controlling a helicopter.

The non-rotary swashplate 14 can be inclined in any direction relative to the rotor mast 2 under the action of a control system 16 (see FIG. 3) comprising three control actuators 17. The control actuators 17 are main servo-controls controlled firstly by a collective pitch control stick 18 and secondly by a cyclic pitch control stick 19, both of which are placed in the cockpit 20 of the helicopter 1. The control actuators 17 act on actuating connection rods 21 for actuating the non-rotary swashplate 14 so as to control the movement of said swashplate in all the directions about the axis of the rotor 2.

In a manner known per se, the control system 16 includes a box of bottom bell-crank levers 23 receiving commands from the cyclic stick 19 and the collective stick 18, and which acts on the automatic pilot auxiliary servo-controls 24. This automatic pilot unit 24 transmits the actions of the sticks to a phase-shifter 25 which merely comprises levers for changing velocity ratios, and which acts on a combiner 27 via plane-offsetting means 26. The combiner then acts on a box of top bell-crank levers 28 which transmits the movement commands via the control actuators 17 to the actuating connection rods 21 for actuating the non-rotary swashplate 14.

The control system 16 further includes a control connection rod 30 placed between the automatic pilot unit 24 and a yaw-collective pitch coupler 240 connected, in particular, to the combiner 27. The control connection rod 30 is a connection rod whose length can be adjusted by an operator or automatically to cause the length of the control system 16 to vary, and thus to control the value of the collective pitch of the blades independently from the collective pitch stick 18. This connection rod 30 is described below with reference to FIGS. 7 to 9.

The method of folding the blades 3 to 6 of the helicopter 1 consists firstly in holding the rotor 2 stationary in an indicated position relative to the longitudinal axis of the helicopter 1, each blade forming an angle of 45 degrees with said longitudinal axis.

Secondly, the collective pitch control stick 18 is placed in a first predefined position that corresponds to a first inclination value I1 of the blades 3 to 6 about their respective longitudinal axes, after having fed the main servo-controls 17 of the helicopter with hydraulic power, and after having interrupted the hydraulic power supply to the automatic pilot unit 24. The inclination I1 is an angle lying in the range defined from the small-pitch position to the large-pitch position of the blades. When the rotor head is used under normal conditions, the inclination value I1 is approximately equal to 6 degrees, corresponding to the small-pitch position.

The cyclic pitch control stick 19 is then placed in a second predefined position which corresponds in the present case to the nose-up position of the rotary-wing aircraft 1. The stick 19 is locked in this position.

The method of folding the blades then consists in modifying the length of the control system 16 to cause the value of the inclination of the blades about their respective longitudinal axes to vary starting from the first inclination value I1. The inclination of the blades is thus caused to go to a second value I2 corresponding to the ideal position of the blades for the purposes of folding them, i.e. to a substantially equal distribution of the spacing between all of the blades, thereby avoiding any risk of interference while the blades are being folded towards the tail boom of the helicopter. In the present case, the inclination I2 is approximately equal to 2 degrees. This variation, which, in the present implementation, is a reduction in the value of the inclination of the blades, is obtained by modifying (increasing in this example) the length of said control connection rod 30 in a manner described below.

Figure 6A:
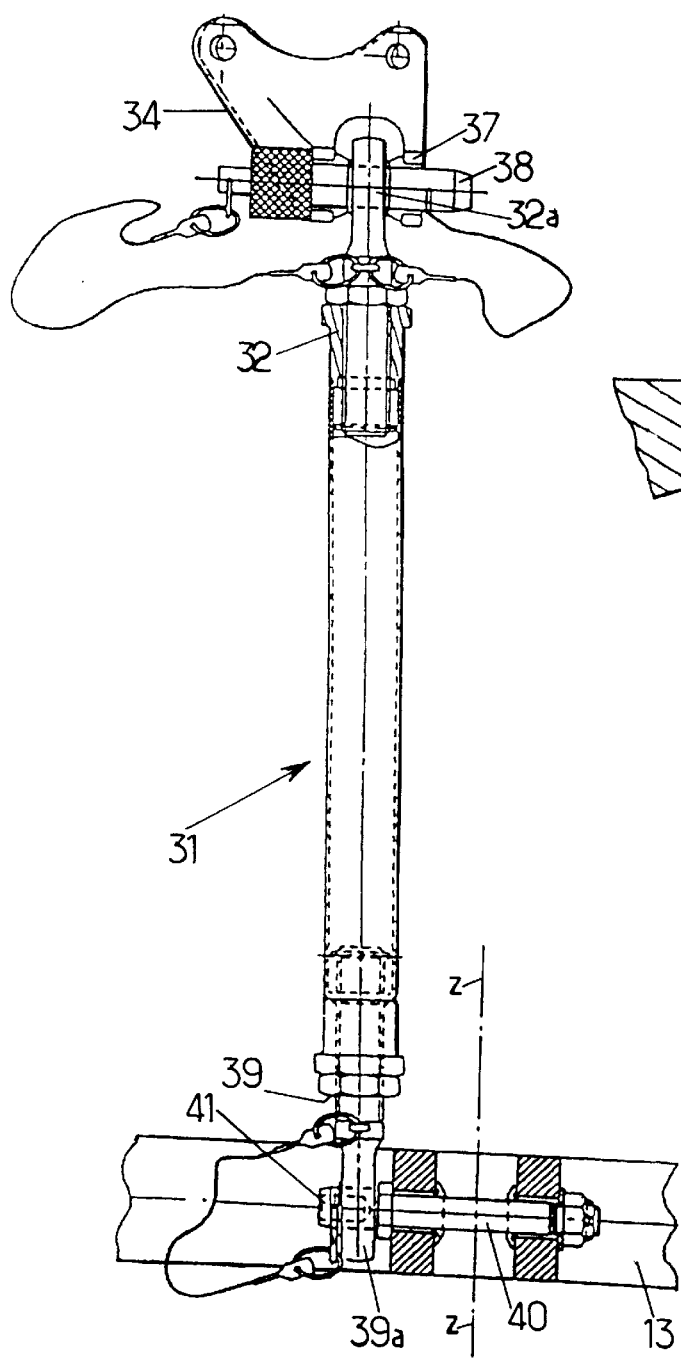
FIG. 6a is a side view of a locking connection rod of the present invention for locking the rotary swashplate.
Figure 6B:
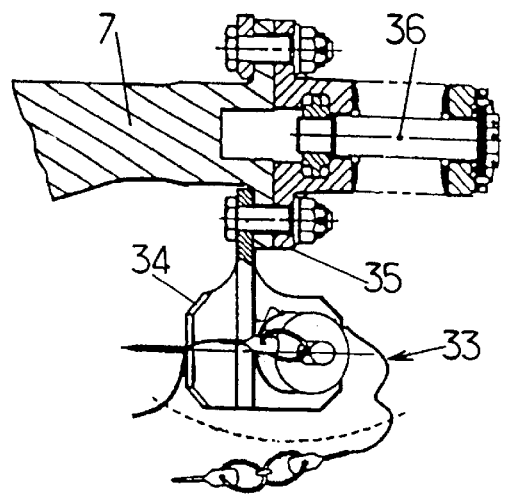
FIG. 6b is an end view of a first end of the locking connection rod.

The rotary swashplate 13 is then held stationary in position by placing at least three locking connection rods 31 between the rotor mast 2 and the rotary swashplate 13, one of these connection rods being shown in FIGS. 6a and 6b.

A first ball-end 32 of the locking connection rod 31 is provided with a ball 32a and is fixed to a member 33 constrained to rotate with the rotor mast 2.

This member 33 is constituted by a bottom end-plate 34 of a coupling 35 between the hub 7 and a drag damper 36 of a blade. The bottom end-plate 34 is provided with a clevis 37 in which the ball 32a of the end 32 of the locking connection rod 31 is retained by means of a cotter pin 38.

The second ball-end 39 of the locking connection rod 31 is provided with a ball 39a and is fixed to a hinge pin 40 which hinges the pitch rod 12 to the rotary swashplate 13, only the axis Z—Z of the pitch rod 12 being shown in FIG. 6a. The ball 39a of the second ball end 39 is fixed to the hinge pin 40 by means of a bolt 41.

As many locking connection rods 31 are placed as there are pitch rods 12, the lengths of the locking connection rods being adjustable so that they can be put in place between the rotary swashplate 13 and each of the couplings 34 for coupling the dampers 36 to the hub 7.

Once the rotary swashplate 13 is held stationary, the blades 3 to 6 are folded by being rotated about respective ones of their coupling pins 9, 10 for coupling them to their sleeves 8. For this purpose, that one of the two coupling pins of each blade which is situated closer to the front of the helicopter is extracted by means of an extractor so that the remaining coupling pin defines the axis of rotation. In the present case, for the blades 3 and 6 situated on the right of the longitudinal axis of the helicopter 1, and given that the rotor rotates clockwise (arrow Ω), the coupling pin that is situated closer to the trailing edge of each of these blades is removed so that each blade can pivot about the coupling pin situated closer to the leading edge. As regards the blades 4 and 5 situated on the left of the longitudinal axis, the coupling pins situated closer to the leading edges are removed so that these blades can pivot about their coupling pins situated closer to their trailing edges.

Figure 4:
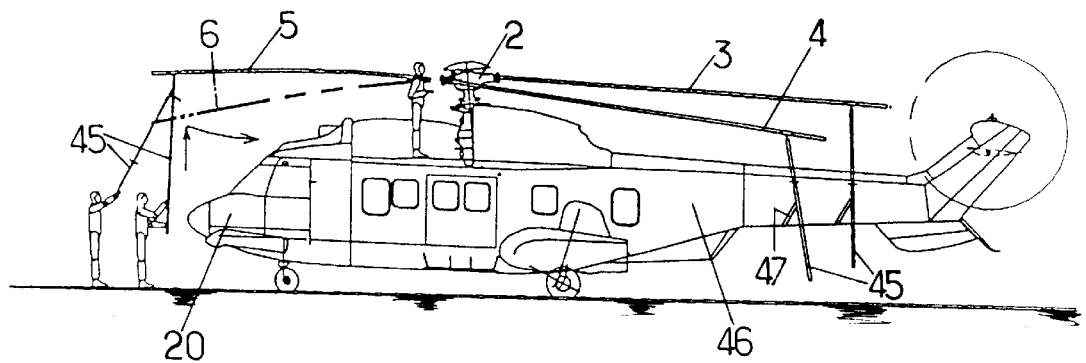
FIG. 4 is a side view of the FIG. 1 helicopter, its blades being shown in the process of being folded.
Figure 5:
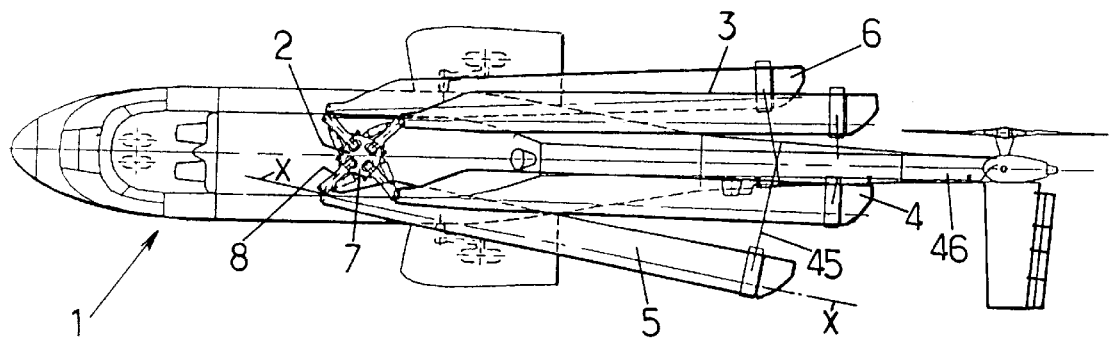
FIG. 5 is a plan view of the FIG. 1 helicopter, its blades being shown in the folded position.

As shown in FIG. 4, the blades 3 to 6 are folded manually by operators by means of poles 45 fixed to the ends of the blades. The blades are folded back towards the tail boom 46 of the helicopter 1, the poles 45 being fastened to the tail boom by means of straps 47 (FIG. 4).

Since the hub 7 carries, in known manner, a rigid lower flap-stop ring also referred to as a "droop-restraining ring" (not shown), then, during folding, firstly the two blades 3 and 4 extending towards the rear of the helicopter are folded in an arbitrary order, then the blade 6 extending frontwards and situated on the right of the longitudinal axis of the helicopter 1 is caused to pivot, followed by the blade 5 extending frontwards on the left of the longitudinal axis. Thus, it should be noted that the influence of the droop-restraining ring intervenes in the folding order of the blades extending towards the front of the helicopter, and not in that of the blades extending frontwards relative to the blades extending rearwards.

In addition, whether or not the hub 7 carries a droop-restraining ring, if a frontwardly extending blade is folded before the rearwardly extending blade on the corresponding side is folded, the latter blade, which is not locked at its free end, might flap under the effect of gusts of wind. As a result, it might collide with the frontwardly extending blade while said frontwardly extending blade is being folded. This risk no longer exists when the rearwardly extending blade is folded first because, since said rearwardly extending blade is then brought towards and locked against the fuselage, its flapping possibilities become very limited. The frontwardly extending blade can then be folded under the best possible safety conditions.

Figure 10:
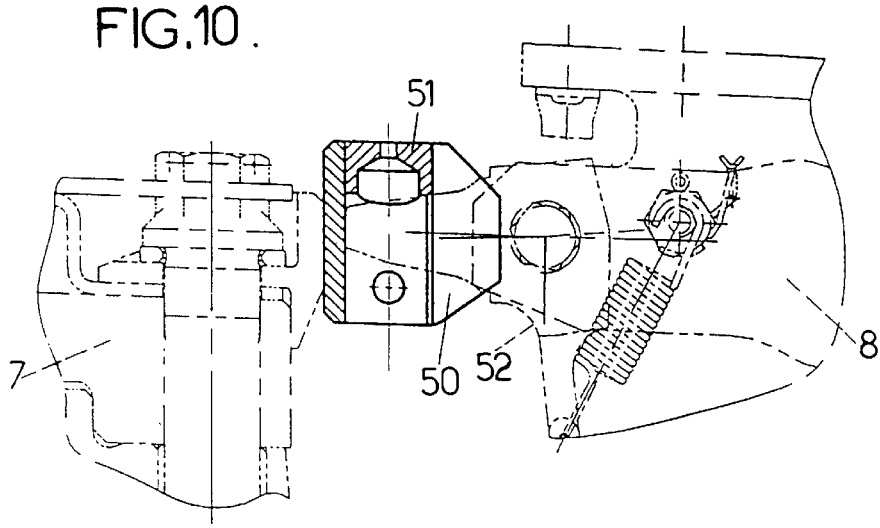
FIG. 10 is a section view of a flap wedge placed on an upper flap stop between the hub and the sleeve.

When the hub 7 is provided with a droop-restraining ring, each of the sleeves 8 of the blades 3 to 6 carries an upper flap stop 50 shown in FIG. 10 so that, when the rotary-wing aircraft is on the ground and the rotor is not rotating or is rotating at low speeds, the blades are prevented from flapping over amplitudes that are too large and that might damage the rotary-wing aircraft or cause accidents. Prior to locking the collective pitch control stick 18 in the small-pitch position at the first value I1, a step of the method consists in placing flap wedges 51 between the hub 7 and the upper flap stops 50 carried by the inner ends 52 of the blade sleeves 8.

The flap wedges positively prevent the blades from flapping, which means that, while the blades are being folded, said wedges prevent the pitch from being modified under reaction from the lower stop ring.

Figure 11:
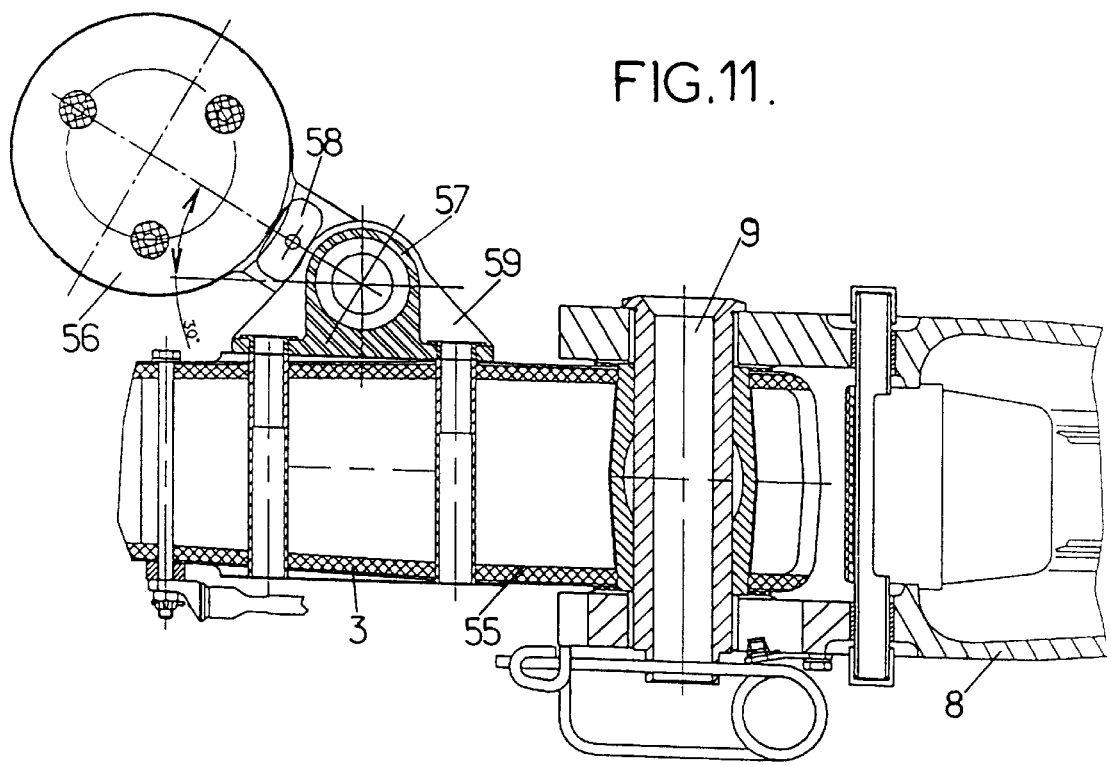
FIG. 11 is a section view of a blade root carrying a vibration damper locked in the high position.

As shown in FIG. 11, the root 55 of each of the blades 3 to 6 carries pendulum vibration dampers 56 hinged about hinge pins 57. Under the effect of the centrifugal force, the vibration dampers are in varying positions when the rotor is in motion, and in the low position when the rotor is stationary. Therefore, so as not to hinder folding of the blades, the vibration dampers 56 are held stationary in the high position prior to putting the flap wedges 51 in place.

Each of the dampers is held stationary by means of a pin 58 interposed between the hinge pin 57 and a fly-weight of the vibration damper and coming into abutment against a portion secured to the blade root, e.g. the bearing 59 of the hinge pin 57.

Figure 8:
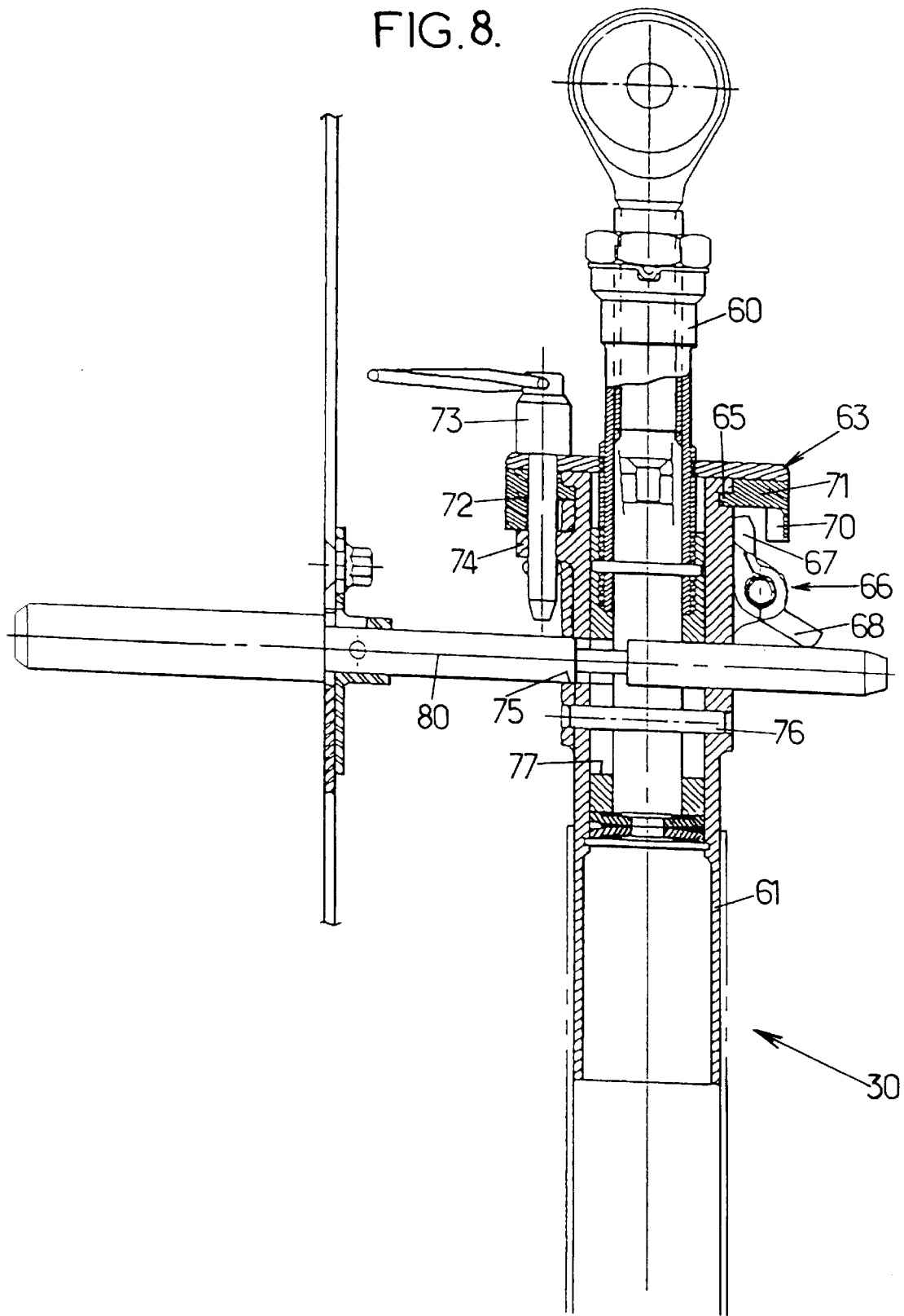
Figure 9:
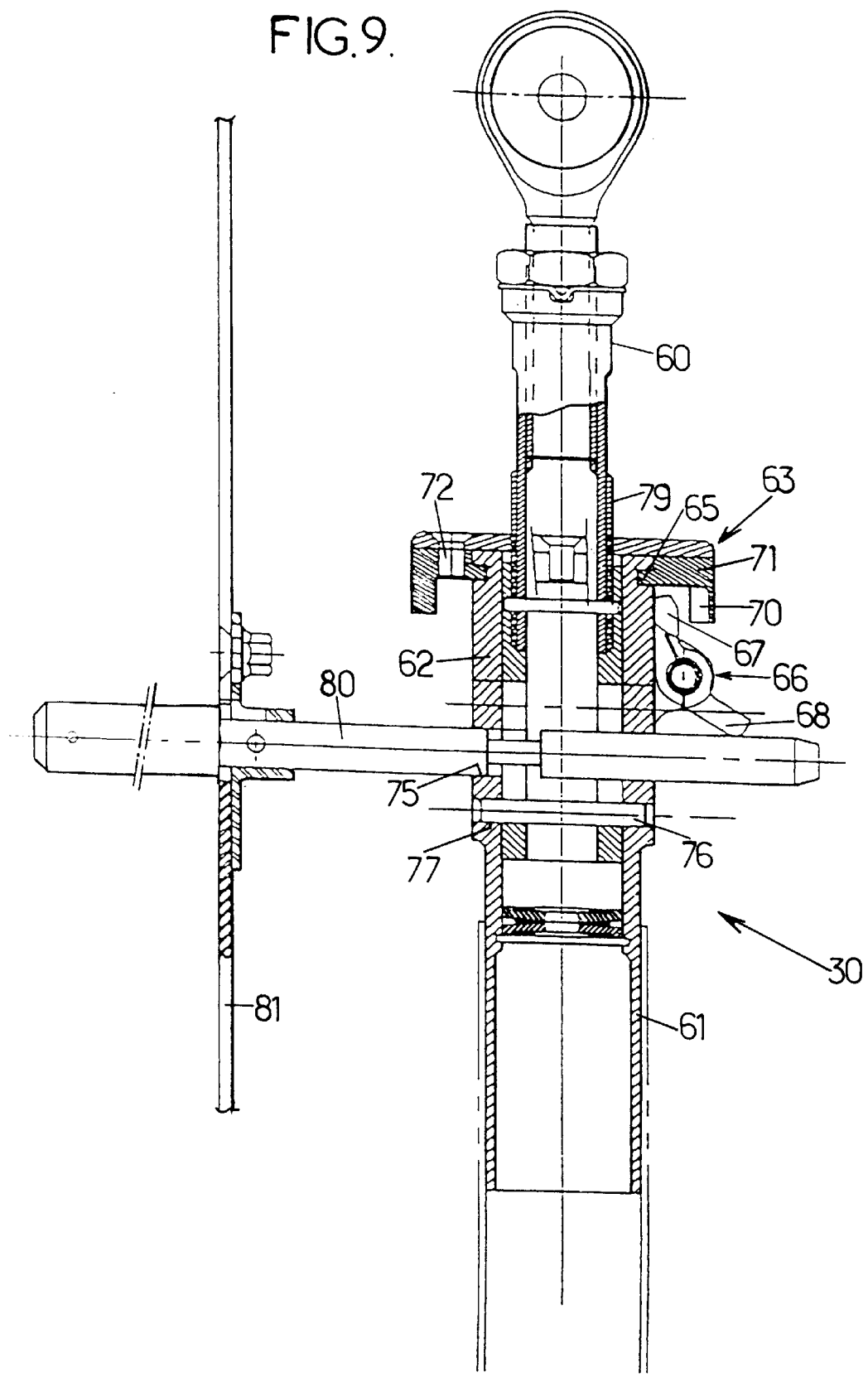

The control connection rod 30 designed to cause the length of the control system 16 to vary is described below with reference to FIGS. 7 to 9.

The control connection rod comprises a "top" first portion 60 slidably received in a "bottom" second portion 61.

The top end 62 of the second portion 61 carries a nut 63. This nut 63 is prevented from moving axially relative to the portion 61, and is mounted to rotate relative thereto by means of a radially inner annular portion 64 of the ring 71 associated with the nut 63, the annular portion penetrating into a complementary groove 65 provided in the top end 62 of the portion 61.

In the vicinity of the nut 63, the second portion 61 carries a catch 66 for preventing the nut 63 from rotating relative to the portion 61. The catch 66 is constituted by two arms 67 and 68 forming an acute angle between them, and hinged to an outside projection 69 on the second portion 61. The arm 67 of the catch 66 is returned resiliently into a notch 70 provided in the ring 71 of the nut 63 so that the nut 63 is normally prevented from rotating relative to the second portion 61.

Diametrically opposite from the notch 70, a longitudinal hole 72 is provided through the ring 71 and through the nut 63, which hole serves to receive a removable pin 73 which also penetrates through a finger 74 carried by the second portion 61.

Furthermore, the bottom portion 61 is provided with a through radial bore 75 facing the arm 68 of the catch 66. Between the bore 75 and its bottom end, the second portion 61 carries a stop pin 76 mounted to pass through a window 77 provided over a portion of the length of the bottom end of the first portion 60. The window 77 is of width equal to the diameter of the bore 75 provided in the second portion 61.

The top portion of the first portion 60 is further provided with a threaded segment 79 designed to co-operate with the nut 63 carried by the second portion 61.

Operation of this control connection rod 30 designed to increase the length of the control system 16 while the blades are being folded is explained below also with reference to FIGS. 7 to 9.

Figure 7:
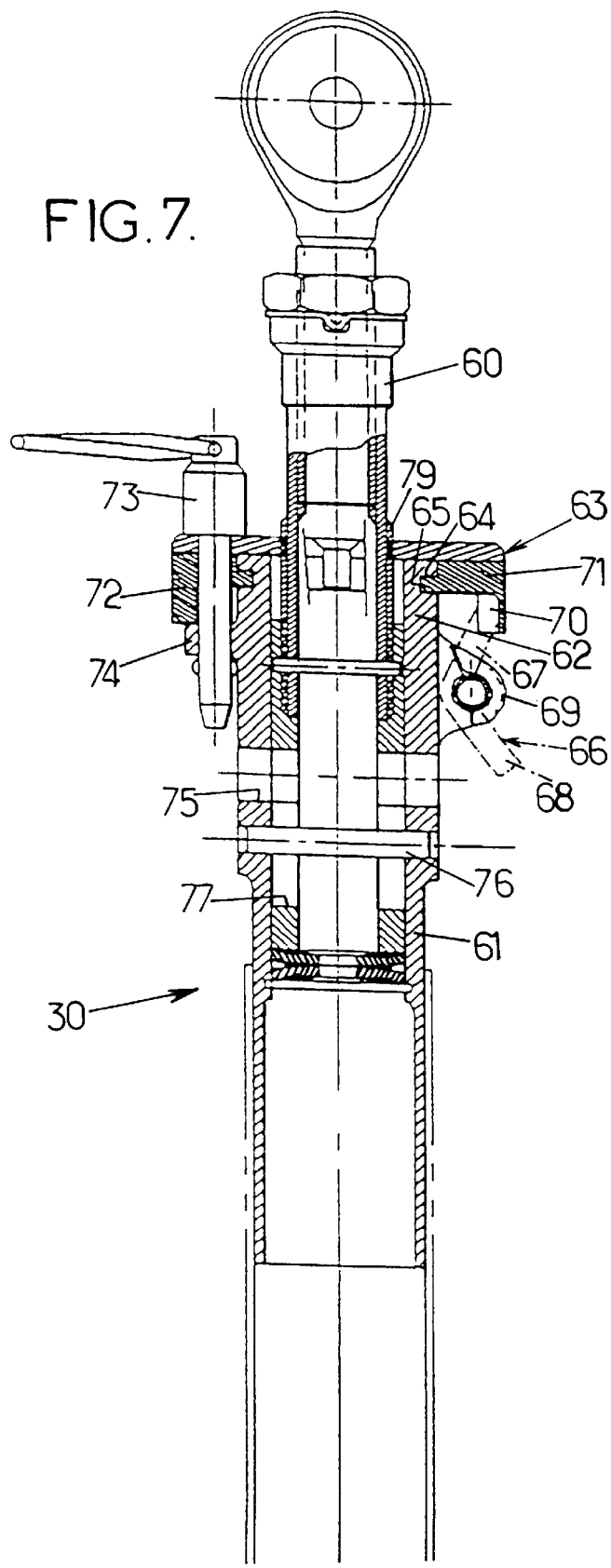
FIGS. 7 to 9 are section views of the control connection rod of the present invention, respectively in a locked state, in a state corresponding to a first pitch value, and in a state corresponding to a second pitch value.

When the rotor is ready for flying, i.e. when the blades 3 to 6 are deployed normally, the control connection rod 30 is in the "locked" position in which the nut 63 is prevented from rotating relative to the second portion 61 of the control connection rod 30 by the arm 67 of the catch 66 co-operating with the notch 70 in the nut 63, and by the pin 73 engaging in the bore 72 through the nut 63 and through the finger 74 on the second portion 61 (FIG. 7).

When the blades are to be folded, in the step consisting in increasing the length of the control system 16 to cause the inclination of the blades 3 to 6 to go from the first value I1 of about 6 degrees to the second value I2 of about 2 degrees, the length of the control connection rod 30 is increased. For this purpose, the two portions 60 and 61 of the connection rod are unlocked from each other so that the first portion 60 can be displaced longitudinally relative to the second portion 61.

For this purpose, the nut 63 forming drive means for longitudinally displacing the first portion 60 relative to the second portion 61 is unlocked by inserting a member 80 through the bore 75 and through the window 77 to disengage the catch 66 from the nut 63. As shown in FIG. 8, the end of the member 80 causes the two arms 67 and 68 of the catch 66 to pivot so that the arm 67 is disengaged from the notch 70 in the nut 63.

The pin 73 is then removed from the bore 72 and from the finger 74. The nut 63 is then totally released by this double unlocking, and an operator can cause it to rotate in co-operation with the threaded section 79 of the first portion 60 so as to displace the first portion longitudinally relative to the second portion 61.

The nut 63 is rotated until the end of the first portion 60 comes into abutment against the stop pin 76 carried by the second portion 61. The pitch of the blades 3 to 6 is then equal to the second inclination value I2 which is substantially equal to two degrees.

The length of the insertion member 80 is such that, on being inserted into the control connection rod 30, one of its ends passes through one of the partitions 81 (FIG. 9) of a control cabinet, in which the control system 16 is placed, so as to project in front of the pilot's seat so that the pilot cannot sit at the controls of the helicopter and thus take off without the control rod 30 being locked.

What is claimed is:

1. A method of folding the blades of a main rotor of a rotary-wing aircraft so that they are disposed substantially parallel to a longitudinal axis of the rotary-wing aircraft, each blade being firstly rotated about an axis of rotation of the rotor via a hub which is constrained to rotate with a rotor mast, and to which said blade is coupled by a coupling member to which the blade is fixed by at least one coupling pin, and secondly constrained to rotate about a longitudinal pitch axis of the blade with a pitch lever controlled by a pitch rod connected to a rotary swashplate that rotates with the rotor mast and that belongs to a cyclic-swashplate mechanism in which the rotary swashplate is mounted to rotate on a non-rotary swashplate that can slide axially along the rotor mast and that can be inclined in any direction relative thereto under the action of a control system including control actuators themselves actuated by two control sticks, namely a collective pitch control stick and a cyclic pitch control stick, placed in a cockpit of the rotary-wing aircraft, wherein, once the rotor is held stationary in an indicated position, the method consists in:

placing the collective pitch control stick in a first predefined position corresponding to a first inclination of the blades about their longitudinal axes;

placing the cyclic pitch control stick in a second predefined position;

modifying the length of the control system to cause the inclination of the blades about their longitudinal axes to go to a second value;

holding the rotary swashplate stationary by placing at least three locking connection rods between the rotary swashplate and a member integral in terms of rotation with the rotor mast; and folding the blades by rotating each of them about a corresponding coupling pin for coupling it to its sleeve.

2. A method according to claim 1, the control system including at least one control connection rod interposed between said control sticks and the control actuators acting on actuating connection rods for actuating the non-rotary swashplate, wherein the length of said at least one control connection rod is modified so as to place the non-rotary swashplate in a position corresponding to said second value of the inclination of the blades.

3. A method according to claim 2, wherein the step consisting in modifying the length of the control connection rod comprises steps consisting in:

unlocking drive means for longitudinally displacing a first portion of the control connection rod relative to a second portion of said control connection rod by inserting a member through said portions so as to disengage means for preventing said drive means carried by said second portion from moving, and by removing a pin preventing the drive means from moving relative to said second portion; and actuating said drive means to cause the first portion to be displaced longitudinally relative to the second portion of said control connection rod.

4. A method according to claim 3, wherein the step in which said member is inserted through said portions consists in causing the member to pass radially through said portions so that said member projects in front of the back of the pilot's seat.

5. A method according to claim 1, wherein the step consisting in holding the rotary swashplate stationary by placing at least three locking connection rods between the rotary swashplate and the member integral in terms of rotation with the rotor mast consists in placing the same number of locking connection rods as there are pitch rods.

6. A method according to claim 5, wherein a first end of each of the locking connection rods is fixed to a coupling for coupling the hub to a corresponding drag damper, and the opposite second end of each of said locking connection rods is fixed to a hinge pin for hinging the corresponding pitch rod to the rotary swashplate.

7. A method according to claim 1, wherein, prior to locking the collective pitch control stick in the position corresponding to said first value of the inclination of the blades, flap wedges are placed between the hub and the inner ends of the blade coupling members.

8. A method according to claim 7, with a rigid lower flap-stop ring being mounted to move radially relative to the rotor mast under the hub, and each of the coupling members of the blades carrying an upper flap stop, wherein the flap wedges are placed between the hub and the upper flap stops.

9. A method according to claim 7, with the roots of the blades carrying pendulum vibration dampers mounted to move between a high position and a low position, wherein the vibration dampers are held stationary in the high position before the flap wedges are put in place.

10. A method according to claim 1, wherein the step consisting in folding the blades comprises steps consisting in:

hooking a pole onto the end portion of each blade to be folded;

lightening the load on the blade hooked onto the pole;

with the blade being coupled to the coupling member by first and second coupling pins situated respectively in the vicinity of the leading edge of the blade and in the vicinity of the trailing edge thereof, extracting that one of the two coupling pins which is situated closer to the front of the rotary-wing aircraft so as to pivot the blade towards the rear of the rotary-wing aircraft about the other coupling pin; and with the rotor being a four-blade rotor, causing the two blades extending towards the rear of the rotary-wing aircraft to be pivoted first, and then successively pivoting the two blades extending towards the front of the rotary-wing aircraft.

11. Apparatus for implementing the method according to claim 2, in which the control connection rod comprises a threaded first portion slidably received in a second portion having one of its ends carrying an unlockable drive nut for longitudinally displacing the first portion relative to the second portion by co-operating with said threaded first portion.

12. Apparatus according to claim 11, wherein the second portion carries a catch for preventing the nut from moving on the second portion, the catch co-operating with a notch provided in the ring of the nut, and designed to be retracted by a member radially passing through the second portion.

13. Apparatus according to claim 11, wherein the control connection rod is provided with a removable pin for preventing the nut from moving on the second portion and which passes through the ring of the nut as well as through a finger carried by the second portion.

14. Apparatus according to any claim 11, wherein the second portion is provided with a stop pin for stopping the first portion on the second portion.

15. Apparatus according to claim 14, wherein a window is provided over a portion of the length of the first portion to enable said first portion to move relative to the stop pin.

16. Apparatus according to claim 11, wherein the lengths of the locking connection rods are adjustable.

17. Apparatus according to claim 11, wherein each of the locking connection rods is provided with a ball at each of its ends, first balls on said rods being designed to be retained by means of cotter pins in devises carried by the couplings for coupling the drag dampers to the hub, and second balls on said rods being designed to be fixed by bolts to the hinge pins of the pitch rods.

* * * * *